8621x
J. J. Janeway.
Heating Stove.
Patented Jan. 27, 1835.
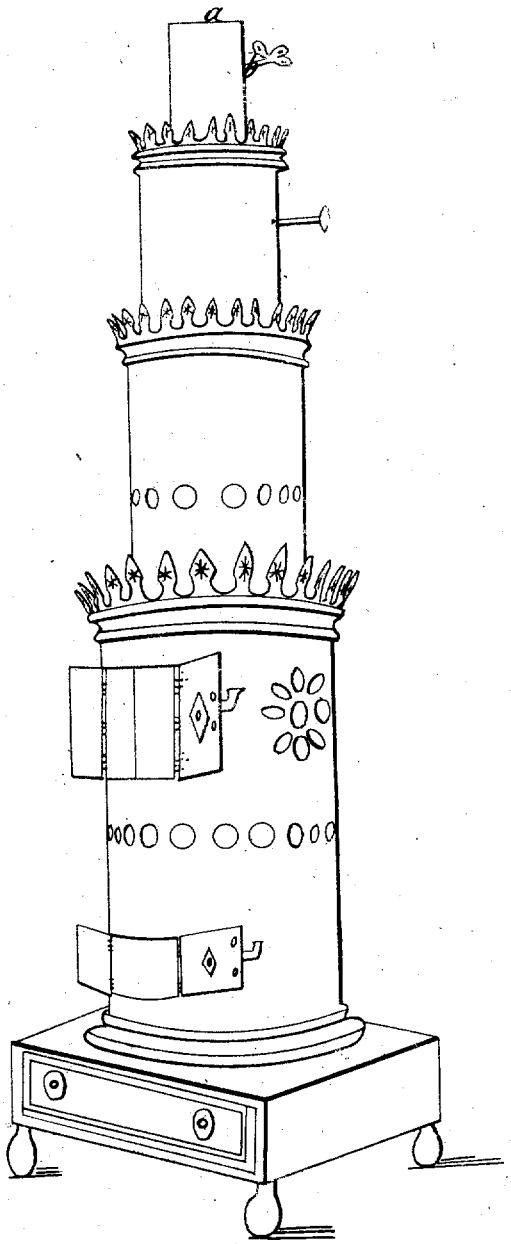
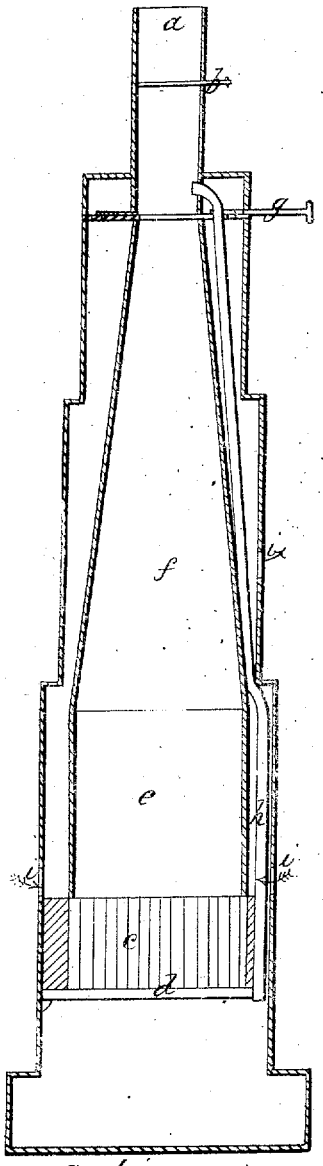
Section.

Jan. 27 1835 8621X 61.

Jacob I. Janeway of New Brunswick. New Jersey
1-27-1835

Letters Patent.

The schedule referred to in these Letters Patent and making part of the same containing a description in the words of the said Jacob I. Janeway himself of his improvement in Stoves for burning Anthracite Coal.

To all to whom these presents shall come.

Be it known that I Jacob I. Janeway of the City of New Brunswick State of New Jersey, have invented a new and useful improvement in Stoves for burning Anthracite Coal, and that the following is a description of the Stove and of the Improvement.

The Stove is made thus; on a square base rests an iron cylinder; and on this a second cylinder of smaller diameter. above which rises a third cylinder of a little less size. From the last cylinder proceeds the pipe with a damper to regulate the heat. On the grate in the first Cylinder are placed fire bricks to secure the burning of the Coal, On the bricks is set a cast iron cylinder of less diameter than the outer cylinder surmounted by a segment of a cone of the same material, the opening of which is surrounded with an iron plate, that fills up the space between the opening and the external iron In this manner a chamber is formed, from which, through apertures made for the purpose in the outer cylinders, heated air is let out, into the hall or entry, The cylinder has an opening in its sides, for putting in the coal, about which the iron projects. In the third cylinder, is placed a valve, which, when opened, furnishes a free & direct passage for the heat to the pipe, but when closed forces the heat through a small aperture, all round near to the third cylinder, so as to bring it into contact, with the outer iron, and thus transmit it into the apartment, the Valve may be constructed either to revolve on an axis, or to slide on the iron plate that surrounds it.

The inventor of this improvement does not claim the use of fire bricks in connection with sheet iron to burn Anthracite Cole, although he first introduced them in this form, in Philadelphia shortly after Anthracite coal was brought to that market, but he claims the construction of the chamber

8621X above described, formed by the fire bricks, the cast iron cylinder the segment of a cone of the same material, the iron plate that surrounds its mouth — and the external cylinder, with apertures in the external iron to let out the heated air & to furnish a free passage for the circulation of the air around the heated cast iron cylinder & segment of a cone of the same material.

He claims also the invention or peculiar application of a valve in the third section or cylinder of the stove, as described above, for the purpose of bringing the heat into closer contact with the outer iron, and thus securing a greater portion of it.

It will be perceived that the principles involved in the above described improvement, may be applied, whether the stove be square or circular, whether the stove consists of one uniform square or cylinder, from the base to the top, or of different sections of different dimensions, or whether the outer iron be cast iron or sheet iron.

Signed this sixth of November, in the Year of our Lord one thousand eight hundred and thirty four.

Witnesses
Jos. Ford
T. Hobart

I. I. Janeway (Drawing)

The subscriber wishes to add something to his Specification in relation to an improvement in stoves for burning Anthracite coal, dated November the 6th 1834 and received by the Patent Office, as appears from the endorsement of his paper Nov. 10th 1834, and now in his hands.

The addition will be immediately after the close of the last paragraph on the sixth page. The whole paragraph, with the addition, will read thus; It will be perceived, that the principle involved in the above described improvement may be applied whether the stove be square or circular, whether the stove consists of one uniform square or cylinder from the base to the top, or of different sections of different dimensions, or whether the outer iron be cast iron or sheet iron" — or whether the inner cylinder be surmounted with cast iron or sheet iron, with a plate around the mouth of the sheet iron, or whether the whole, that is, the inner cylinder, the segment of a cone above it, and the plate around its mouth, be made of sheet iron.

The subscriber intends to improve some of the stoves by adding an ash pipe, running from below the grate, perforated with a hole or not, through or behind the bricks; & so passing through or above the plate surrounding the mouth of the segment of the cone; with a sliding valve either at the top, or at the bottom of the pipe. The valve is to be opened when the ashes are being let down, and closed when the operation is finished.

The design of this pipe is to prevent the finer particles of the ashes from coming into the apartment. The subscriber claims as his invention, this peculiar application of an ash pipe. Signed this fifteenth day of January in the year of our Lord one thousand eight hundred and thirty five.

Witnesses
Jos. Ford }
H. Boorman }

J. J. Janeway.

Exd
Ch.f.W.

966 Woods ]

(Patented 27 January 1835)

(Drawing)